United States Patent
Duffy et al.

(10) Patent No.: US 9,286,039 B2
(45) Date of Patent: Mar. 15, 2016

(54) OPERATING SYSTEM SUPPORT FOR CONTRACTS

(71) Applicant: Microsoft Corporation, Redmond, WA (US)

(72) Inventors: John J. Duffy, Seattle, WA (US); Jared Porter Parsons, Kirkland, WA (US); Colin Stebbins Gordon, Seattle, WA (US); Alexander Daniel Bromfield, Seattle, WA (US); Martin Taillefer, Redmond, WA (US); David Allen Bartolomeo, Lake Stevens, WA (US); Michael Barnett, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 65 days.

(21) Appl. No.: 13/829,561

(22) Filed: Mar. 14, 2013

(65) Prior Publication Data

US 2014/0282448 A1    Sep. 18, 2014

(51) Int. Cl.
   *G06F 9/54*    (2006.01)
   *G06F 9/455*   (2006.01)
   *G06F 9/45*    (2006.01)

(52) U.S. Cl.
   CPC   *G06F 8/41* (2013.01); *G06F 8/436* (2013.01); *G06F 8/52* (2013.01); *G06F 9/45512* (2013.01); *G06F 9/54* (2013.01)

(58) Field of Classification Search
   None
   See application file for complete search history.

(56) References Cited

U.S. PATENT DOCUMENTS

| | | | |
|---|---|---|---|
| 6,601,192 B1 | 7/2003 | Bowman-Amuah | |
| 7,143,373 B2 | 11/2006 | Moorby | |
| 2003/0023959 A1* | 1/2003 | Park | 717/151 |
| 2006/0107258 A1* | 5/2006 | Takabatake | 717/151 |
| 2008/0147698 A1 | 6/2008 | Gustafsson et al. | |
| 2009/0164973 A1* | 6/2009 | Barnett et al. | 717/110 |
| 2010/0218169 A1* | 8/2010 | Andersen et al. | 717/125 |

OTHER PUBLICATIONS

Na Xu, "Static contract checking for Haskell", Dec. 2008, University of Cambridge.*
Wikipedia, "Common Intermediate Language", Mar. 31, 2011, wikipedia.com.*
Gunnar Peipman, "Example: Controlling randomizer using code contracts", May 2, 2010, asp.net.*
Janina Voigt, "Improving Object Oriented Software Contracts", May 2011, Department of Computer Science and Software Engineering University of Canterbury.*

(Continued)

*Primary Examiner* — Qing Wu
*Assistant Examiner* — Wynuel Aquino
(74) *Attorney, Agent, or Firm* — John Jardine; Aaron Hoff; Micky Minhas

(57) ABSTRACT

A front-end compiler compiles source code into intermediate code, that may later be compiled into binary code. The source code defines an execution scope and includes a contract. When a contract is encountered at runtime of an execution scope, further execution of that execution scope is conditioned on whether a predicate associated with the contract is true. The front-end compiler operates so as to preserve the contract so that the contract continues to be semantically structured such that the predicate may be removed from the intermediate language code. The contract may thus continue to be understood by semantic analysis of the contract. Thus, the predicate may be understood by static analysis tools that operate on the intermediate code.

20 Claims, 6 Drawing Sheets

(56) References Cited

OTHER PUBLICATIONS

Mahmoud, Qusay H., "Using Assertions in Java Technology", Published on: Jun. 14, 2005, Available at: http://www.oracle.com/us/technologies/java/assertions-139853.html.

"Contracts FAQ", Published on: Mar. 10, 2009, Available at: http://research.microsoft.com/en-us/projects/contracts/faq.aspx.

"Operating Systems Help Us Limit Harm from Failures", Published on: Nov. 7, 2012, Available at: http://www.drdobbs.com/cpp/operating-systems-help-us-limit-harm-fro/240062576.

Henne-Wu, et al., "Support for Design by ContractTM in the C# Programming Language", In Journal of Object Technology, vol. 4, Issue 7, Sep. 2005, 18 pages.

Plösch, et al., "Evaluation of Assertion Support for the Java Programming Language", In Journal of Object Technology, vol. 1, Issue 3, Aug. 2002, 13 pages.

"C# Station Assertion", Published on: Jun. 7, 2004, Available at: http://www.csharp-station.com/Articles/Assertions.aspx.

U.S. Appl. No. 12/422,764, Duffy, et al., "Type System Support for Memory Isolation Permissions", Filed Date: Apr. 13, 2009.

Flanagan, Cormac, "Hybrid type checking", Jan. 11-13, 2006, Proceeding POPL '06 Conference record of the 33rd ACM SIGPLAN-SIGACT symposium on Principles of programming languages, pp. 245-256, Available at: http://dl.acm.org/citation.cfm?id=1111037.1111059.

Knowles, Kenneth and Flanagan, Cormac, "Hybrid type checking", Published in Journal, ACM Transactions on Programming Languages and Systems (TOPLAS), vol. 32 Issue 2, Jan. 2010, Article No. 6, Available at: http://dl.acm.org/citation.cfm?id=1667048.1667051.

"International Search Report & Written Opinion for PCT Patent Application No. PCT/US2014/023258", Mailed Date: Sep. 19, 2014, 14 Pages.

Schwartz, et al., "All You Ever Wanted to Know about Dynamic Taint Analysis and Forward Symbolic Execution (but Might Have Been Afraid to Ask)", In IEEE Symposium on Security and Privacy, May 16, 2010, pp. 317-331.

Chess, et al., "Secure Programming with Static Analysis: Getting Software Security Right with Static Analysis", A Pearson Addison Wesley Professional, Jul. 29, 2007, 4 Pages.

* cited by examiner

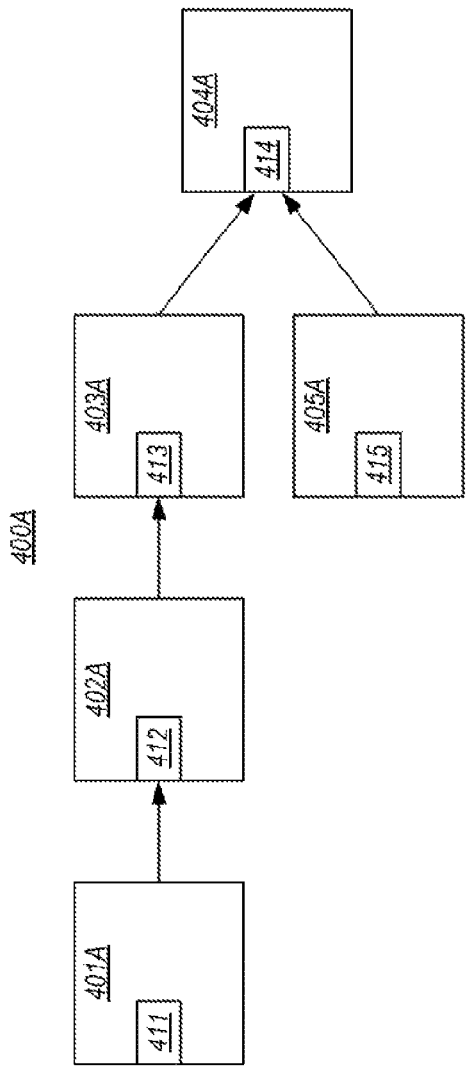
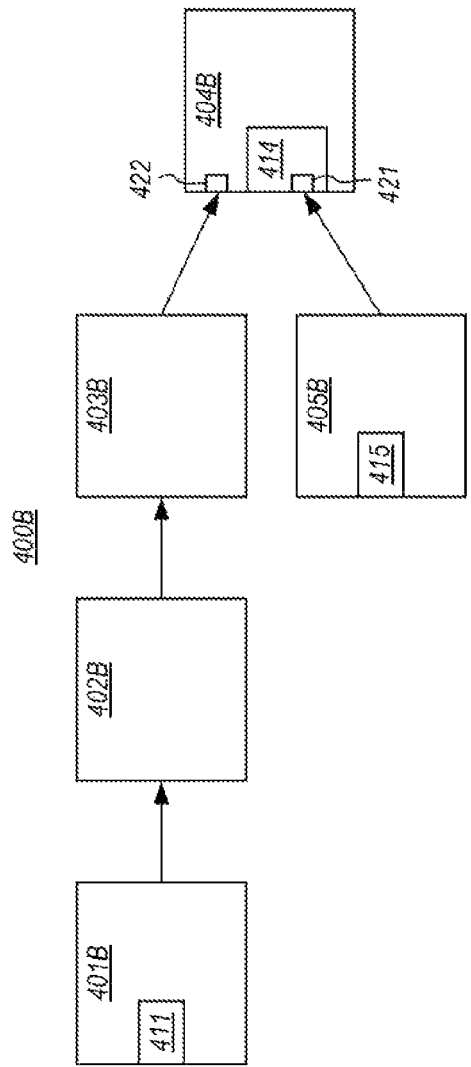

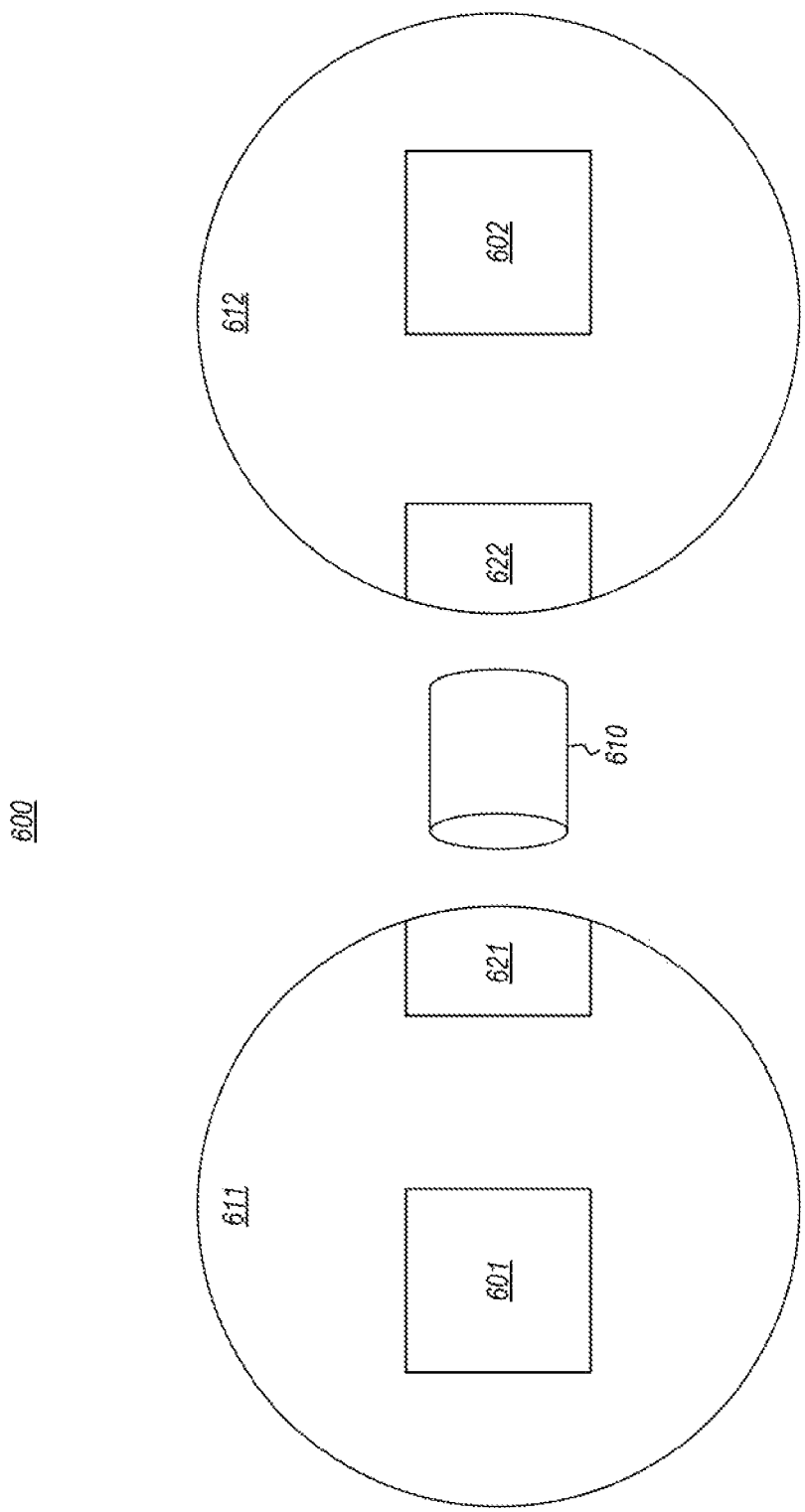

US 9,286,039 B2

OPERATING SYSTEM SUPPORT FOR CONTRACTS

BACKGROUND

Computers and computing systems have affected nearly every aspect of modern living. Computers are generally involved in work, recreation, healthcare, transportation, entertainment, household management, etc. Computer functionality is typically the result of computing systems executing software code.

A substantial portion of modern software code is dedicated to discovering, reporting, and recovering from error conditions. In real-world scenarios, error conditions are relatively rare and are often difficult to simulate, yet programmers devote a substantial amount of resources to dealing with them.

Within software systems, a disproportionate number of bugs exist in error recovery code as compared to the total code in these systems. This directly correlates to the fact error conditions are often difficult to simulate and as a result often go untested until a customer encounters the underlying issue in the field. Improper error recovery logic can lead to compound errors and ultimately to crashes and data corruption.

Traditional software systems comingle different types of error conditions and provide a single mechanism for dealing with these error conditions. This uniformity is appealing on the surface as it allows developers to reason about error conditions in a single consistent way for the system. Unfortunately, this uniformity obfuscates qualitative differences in errors.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

In accordance with at least one embodiment described herein, a system is described in which a front-end compiler compiles source code into intermediate code. The intermediate code may later be compiled into binary code. The source code includes a contract check. When the check is encountered at runtime of an execution scope, further execution of that execution scope is conditioned on whether a predicate associated with the contract is true. If the predicate is not true, the execution scope no longer runs. For instance, if the execution scope were a program, the program would abandon without running internal error recovery logic. Optionally, external error recovery logic may be run.

The front-end compiler operates so as to preserve the contract check so that the check continues to be semantically structured such that the check may continue to be understood by semantic analysis of the program. Thus, the check may be understood by static analysis tools that operate on the intermediate code.

For instance, the static analysis code may be a back-end compiler that generates binaries based on the intermediate code. One type of analysis might be to determine whether the predicate associated with the contract check will be true under all conditions and to forego execution of the check at runtime. Another type of analysis might be to determine that the execution associated with the check will be true under a certain condition (such as an execution component being called by another component) and to forego the check at runtime when that condition is met. Another type of analysis might be to determine that the predicate associated with the check will always be false, and to alert the programmer that the program contains a bug. Other types of static analyzers that may operate on the intermediate code include refactoring tools, verification tools, automated documentation generators, and so forth.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 4A illustrates a chain of potential component calls expressed within source code or intermediate language code, in which each component has a contract in the form of a precondition;

FIG. 4B illustrates the chain of potential component calls expressed in binary code in which the execution flow has been optimized to remove some contract checks, and to include multiple entry points for components that conditionally require checking the contract;

FIG. 6 illustrates an environment in which the inter-process communication may occur.

DETAILED DESCRIPTION

In accordance with embodiments described herein, a system is described in which a front-end compiler compiles source code into intermediate code. The intermediate code may later be compiled into binary code. The source code includes a contract. When the contract is encountered at runtime of an execution scope, further execution of that execution scope is conditioned on whether a predicate associated with the contract is true. If the predicate is not true, the execution scope no longer runs. For instance, if the execution scope were a program, the program would abandon without running internal error recovery logic. Optionally, external error recovery logic may be run.

The front-end compiler operates so as to preserve the contract so that the contract continues to be semantically structured such that the contract may continue to be understood by semantic analysis of the contract. Thus, the contract may be understood by static analysis tools that operate on the intermediate code. Such static analysis tools might include back-end compilers, refactoring tools, verification tools, automated documentation generators, and so forth.

Some introductory discussion of a computing system will be described with respect to FIG. 1. Then, an example system and its example operation will be described in the order provided above with respect to FIGS. 2 through 6.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
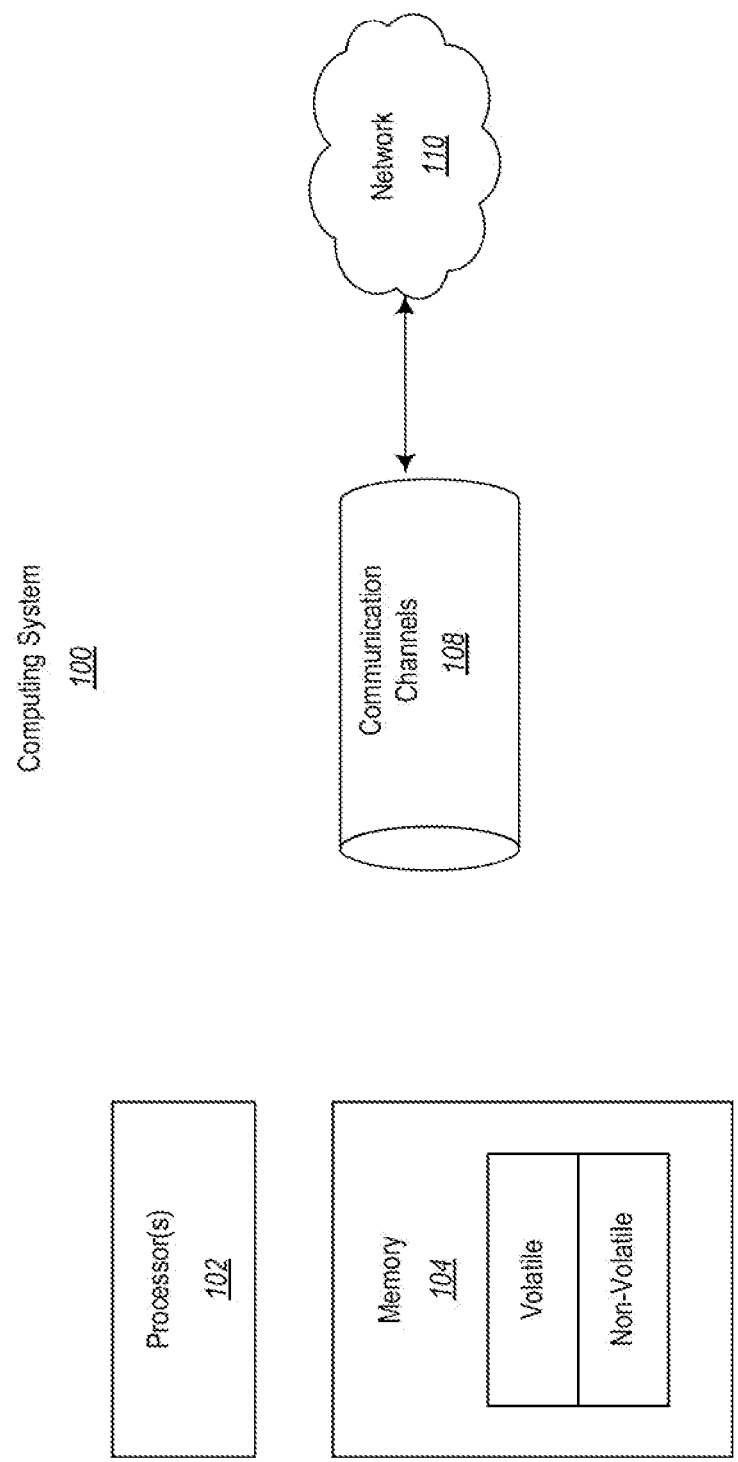
FIG. 1 abstractly illustrates a computing system in which some embodiments described herein may be employed.

As illustrated in FIG. 1, in its most basic configuration, a computing system 100 includes at least one processing unit 102 and computer-readable media 104. The computer-readable media 104 may conceptually be thought of as including physical system memory, which may be volatile, non-volatile, or some combination of the two. The computer-readable media 104 also conceptually includes non-volatile mass storage. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads). Such executable modules may be managed code in the case of being executed in a managed environment in which type safety is enforced, and in which processes are allocated their own distinct memory objects. Such executable modules may also be unmanaged code in the case of executable modules being authored in native code such as C or C++.

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface controller (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
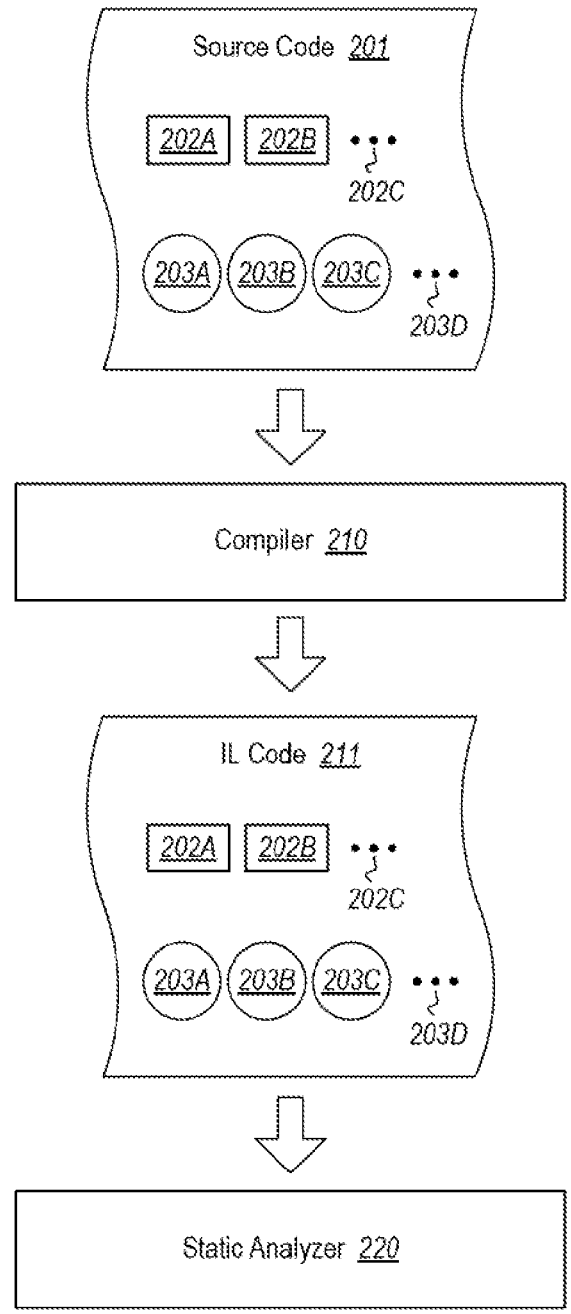
FIG. 2 schematically illustrates an environment in which source code is compiled into intermediate language code in a manner in which the contracts and assertions (i.e., a contract check) expressed in the source code are semantically preserved, and in a manner in which the behaviors expressed in the source code remain.

FIG. 2 illustrates a system 200 that comprises a compiler 210. The compiler 210 might operate using, for example, the computing system 100. For instance, the computing system 100 might have access to computer-executable instructions stored one or more computer-readable storage media that compose a computer program product. The computing system 100 might execute those computer-executable instructions using processor(s) 102 thereby causing the computing system to instantiate and/or operate the compiler 210.

The compiler 210 accesses source code 201 and generates intermediate language code 211 in response. The intermediate language code 211 cannot be run by a computing system directly without first converting into machine-executable code, often called "binary code", or "binary". Nevertheless, the intermediate language code 211 may be statically analyzed by a static analysis tool 220.

The source code 201 as illustrated includes two contracts 202A and 202B. However, the ellipses 202C represent that there may be any number of contracts within the source code. The contracts 202A, 202B and 202C will hereinafter also be referred to collectively as "contracts 202". Each contract conditions further execution of an execution scope dependent on whether a predicate is true when encountered in the runtime environment in which the binary is actually executed. The "execution scope" is defined as the program being compiled by the compiler 210 as well as any code drawn into the program as part of compilation.

Figure 3A:
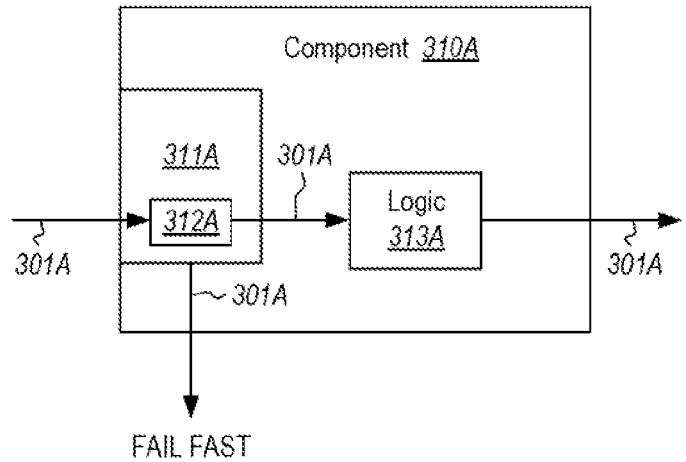
FIG. 3A illustrates an environment in which execution flow reaches a component that has a contract in the form of a precondition, and illustrates possible fail fast if the pre-condition is not met.

For instance, a contract might be associated with a precondition for a component, in which case when the component is called, the context is checked by evaluating the precondition. If the precondition is not true, the component does not execute. For instance, FIG. 3A illustrates an environment 300A in which execution flow 301A reaches a component 310A. A contract 311A has an associated predicate 312A. The predicate 312A is verified to determine whether the precondition has been satisfied or not. If the predicate 312A is true, the logic 313A of the component 310A is executed and execution flow 301A continues as normal. If, however, the predicate 312A is not true, the logic 313A of the component 310 is not executed and instead the execution flow 301A encounters a fail fast event.

A fail fast event means the execution context (i.e., the compiled program) is not permitted to continue to run. If error recovery logic does execute, the error recovery logic is not provided from internal to the execution context. Instead, error recovery logic, if run at all, is external error recovery logic that runs outside of the execution scope.

Figure 3B:
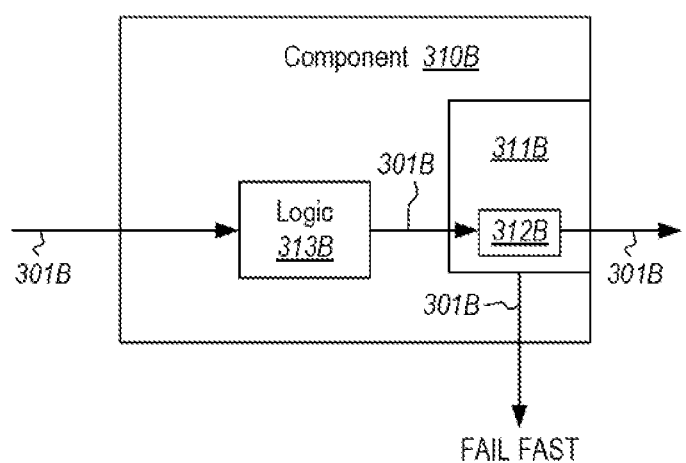
FIG. 3B illustrates an environment in which execution flow reaches a component that has a contract in the form of a post-condition, and illustrates possible fail fast if the post-condition is not met.

A contract might be associated with a post-condition for a component, in which case when the component is called, the post-condition is checked only after the logic of the component has been executed. For instance, FIG. 3B illustrates an environment 300B in which execution flow 301B reaches a component 310B. The logic 313B of the component then executes. After the logic 313B completes, the execution flow 301B encounters the contract 311B having the associated predicate 312B. At this point, the predicate 312B is verified to determine whether the post-condition has been satisfied or not. If the predicate 312B is true, the execution flow 301B exits from the component 310B and continues as normal. If, however, the predicate 312B is not true, the execution flow 301B encounters a fail fast event.

Returning to FIG. 2, the source code 201 as illustrated also including three behaviors 203A, 203B and 203C. However, the ellipses 203D represent that there may be any number of behaviors within the source code 201. The behaviors 203A, 203B, 203C and 203D will hereinafter also be referred to collectively as "behaviors 203". The behaviors are the actual actions associated with the logic of the program. For instance, referring to FIGS. 3A and 3B, the behaviors 203 are actually part of the logic 213A and 213B of the components 210A and 210B.

The compiler 210 generates the intermediate language code 211 such that the behaviors 203 are all preserved. In other words, when the intermediate language code 211 is later converted into binary code, the binary code has the binary instructions that cause the behaviors. The intermediate language code 211 also includes the contracts 202 in a semantically structured way so that the contracts may be removed from the intermediate language code 211 without changing the instructed behaviors 203.

In some embodiments, the compiler 210 is configured to detect at least some conditions under which the predicate includes an externally visible side effect. In that case, the compiler 210 enforces that there are to be no externally visible side effects by raising an error in the compilation process thereby causing the author of the source code 201 to make a correction to remove the externally visible side effect from the contract or assertion that contains the predicate. In this way, the contracts 202 that remain after compilation can be treated as having no externally visible side effects.

The contracts 202 that are pre-conditions are semantically structured in such a way that the caller of the executable component has a semantic understanding of the contract prior to calling the component. For instance, consider the case of FIG. 3A, the contract 311A will be semantically accessible to the caller of the component 310A. Thus, much like a caller has semantic understanding of the Application Program Interface (API) of the component 310A, the caller will also have semantic understanding of the contract 312A. Thus, at runtime, a first component that is to call a second component may first check to make sure the contract of the second component will be met before making the call to the second component. If the first component determines that the contract will be met, the first component may make the call. However, if the first component determines that the contract will not be met, the first component may abstain from calling the second component, since the call would cause a fail fast event. The first component may then be configured to try an alternative execution path, thereby preventing an unnecessary fail fast event.

The system 200 also includes a static analysis tool 220. The static analysis tool 220 is configured to evaluate the intermediate language code 211 including execution of the contract checks 202 included within the intermediate language code 211. Various examples of the static analysis tool 220 will be provided. These examples are not mutually exclusive. There may be multiple static analysis tools 220 that statically analyze the intermediate language code 211 including the contracts 202 contained therein.

The static analyzer 220 might operate using, for example, the computing system 100. For instance, the computing system 100 might have access to computer-executable instructions stored on one or more computer-readable storage media that compose a computer program product. The computing system 100 might execute those computer-executable instructions using processor(s) 102 thereby causing the computing system to instantiate and/or operate the static analyzer 220.

As an example, the static analyzer might be a back-end compiler that generates binary based on the intermediate language code 211. In contrast, the compiler 210 may be viewed as a front-end compiler. The front-end compiler converts source code to intermediate language code. The back-end compiler converts the resulting intermediate language code to machine code. Having access to the semantic structure of the contracts 202 within the intermediate language code 211, the back-end compiler 220 may make any number of optimizations based on this semantic knowledge. Several of these optimizations will now be described with respect to FIGS. 4A and 4B.

FIG. 4A illustrates a chain 400A of potential component calls expressed in the source code or intermediate language code. The chain 400A includes five components 401A through 405A, each having associated contracts 411 through 415 that are pre-conditions. Component 401A may call component 402A, which executes provided the contract 412 is met. Component 402A may call component 403A, which executes provided the contract 413 is met. Component 403A may call component 404A, which executes provided the contract 414 is met. Component 405A also may call component 404A, which executes provided the contract 414 is met. The chain 400A represents the possible execution flows as represented by the semantic structure of the contracts 202 and behaviors 203 expressed in the source code, and hence the intermediate language code 211.

The back-end compiler may statically analyze the intermediate language to formulate a concept of the chain 400A. The back-end compiler is configured to perform static analysis to attempt to determine if the predicate of a contract for an associated component will always be true based on the back-end compiler knowledge of what might occur at runtime. If the back-end compiler determines that the predicate will always be true, then the back-end compiler may optimize the binary by removing the contract check altogether.

For instance, referring to FIG. 4A, suppose that the back-end compiler determines that predicate associated with the contract 412 will always be true at the time that the component 402A is called. In that case, the compiler generates binary that obviates checking the contract at runtime if the interaction has occurred. FIG. 4B shows a binary component chain 400B that has the same functional behaviors as the intermediate language chain 400A. Specifically, the logic of intermediate language components 401A through 405A is implemented by the corresponding binary components 401B through 405B. However, note that binary component 402B does not check the contract 412, thereby making execution of the binary component 402B more efficient.

Likewise, the back-end compiler determines that predicate associated with the contract 413 will always be true at the time that the component 403A is called. The corresponding binary component 403B is thus generated without checking the contract 413. Again, this makes execution of the binary component 403 more efficient.

The back-end compiler determines that the contract 414 will be met (that is the back-end compiler can determine that the predicate associated with the contract will be true) if the component 404A is called by the component 403A. However, the back-end compiler cannot determine whether the contract 414 will be met (that is the back-end compiler cannot verify the truth of the predicate associated with the contract) if the component 404A is called by the component 405A. In this case, the binary component 404B is created with two entry points. One of the entry points 422 allows the checking of the contract 414 to be bypassed, which would be the appropriate entry point for the binary component 403B in this example. The other entry point 421 causes the contract 414 to be checked, which would be the appropriate entry point for the binary component 405B in this example.

The static analyzer 220 might also cooperate with the front-end compiler 210 to ensure that a predicate has no externally visible side-effects. Of course, the runtime evaluation of the predicate does consume some processing cycles, but said evaluation does not otherwise affect the logic of the component, nor the semantically expressed behaviors 203 of the program under compilation. The predicate might include some side calculations that do not result in any externally observable results outside of the program. However, this is not considered a "side-effect" in this description and the claims. By ensuring that there are no externally observable side-effects, the program will run with the same externally observable behavior, regardless of whether contract checks are present or not. This is helpful as contract checks are often included for authoring and testing of the program, but often removed prior to shipping the program. Thus, the behavior of the program under test will be the same as the behavior after the program is shipped.

The static analyzer 220 might also be a refactoring tool, a verification tool, an automated documentation generator, and/or perform any other type of static analysis on the intermediate language code 211 using the contracts 202 semantically expressed within the intermediate language code 211. For instance, the static analyzer 220 might determine that the predicate associated with the contract will always be false, and to alert the programmer that the program contains a bug.

Thus, the principles described herein permit strong and intelligent static analysis of intermediate language code that includes contracts, and permits significant optimizations to be made to the binary when one component calls another component. The principles may also be extended to cases in which a component from one process calls a component from another process.

Figure 5A:
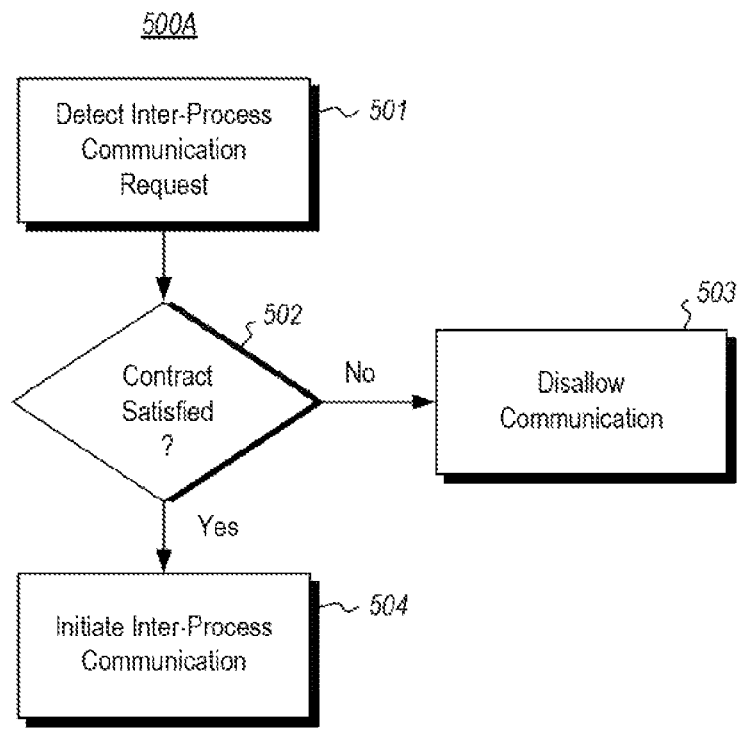
FIG. 5A illustrates a flowchart of method 500A for facilitating inter-process communication from the perspective of the transmitting process.
Figure 5B:
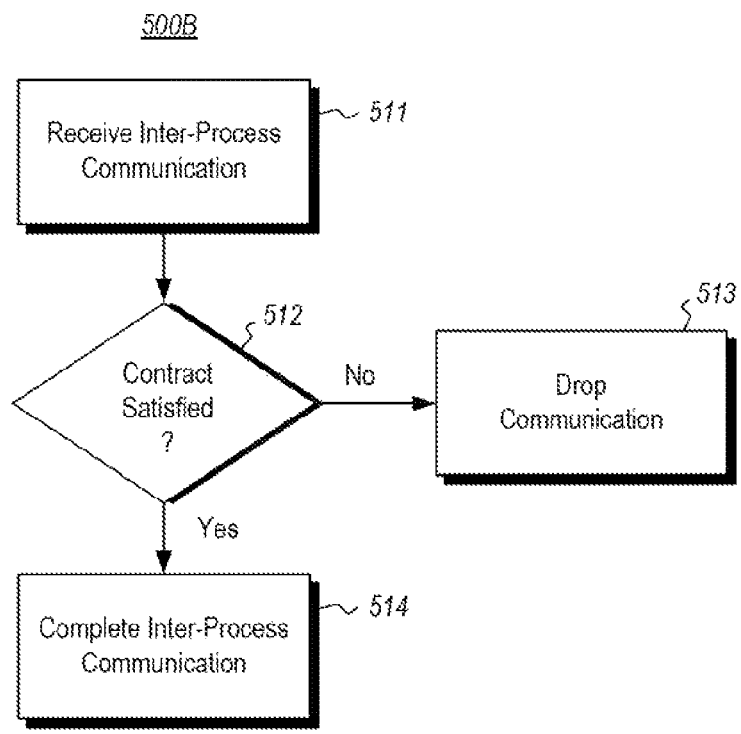
FIG. 5B illustrates a flowchart of method 500A for facilitating inter-process communication from the perspective of the receiving process.

FIGS. 5A and 5B respectively illustrates a flowchart of method 500A and 500B for facilitating inter-process communication. The method 500A, if performed, would be performed prior to the method 500B of FIG. 5B. The method 500B (and the method 500A if performed) may be accomplished by an abstraction layer that conceptually resides within the channel of the inter-process call. FIG. 6 illustrates an environment 600 in which the inter-process communication may occur. Accordingly, FIGS. 5A and 5B will be described with frequent reference to the environment 600 of FIG. 6.

The method 500A of FIG. 5A is performed responsive to a detection that a first component within a first process has requested an inter-process communication with a second component within a second process (act 501). For instance, in the environment 600 of FIG. 6, suppose that the component 601 within process 611 is to send a communication to the component 602 within process 612. The method 500A may then be performed by a channel component 621 within the process 611, while the method 500B may then be performed by a channel component 622 within the process 612. The workings of the methods 500A and 500B may be hidden from the components 601 and 602. Instead, the components 601 and 602 may simply view the communication as being facilitated through an inter-process channel 610.

Responsive to the notice that an inter-process communication is to be sent from the first component 601 (act 501 in FIG. 5A), the channel component 621 may verify whether a contract for continued execution is satisfied (decision block 502 in FIG. 5A). The contract might include a predicate designed to allow for safe inter-process communication. If the contract is not met ("No" in decision block 502), the channel component 621 prohibits the communication (act 503). On the other hand, if the contract is met ("Yes" in decision block 502), the channel component 621 sends the inter-process message to the channel component 622 in the target process (act 504).

FIG. 5B illustrates a flowchart of a method 500B for a target channel component to process an incoming message, regardless of whether method 500A was previously performed. The channel component 622 first receives the inter-process message (act 511). The channel component 621 may then verify whether a contract for continued execution is satisfied (decision block 512 in FIG. 5B). Again, the contract might include a predicate designed to allow for safe inter-process communication.

If the contract is not met ("No" in decision block 512), the channel component 622 prohibits the communication (act 513), and may also terminate any right of the process 611 to communicate with the process 612 in the future. Since the contract was not met as determined by the target channel component 622, it is more likely that the calling process 611 did not perform the method 500A. Thus, the process would seem to not be complying with safe communication, and termination of any communication between the process 611 and 612 might be warranted. Thus, any flaws that might cause fail fast may be confined to the process that includes that flaw. On the other hand, if the contract is satisfied ("Yes" in decision block 512), the inter-process communication is passed to the target component 602 (act 514).

Accordingly, the preservation of the semantic structure of a contract in intermediate language code. Furthermore, the use of such a semantic structure to optimize compilation into binary has been described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising: one or more hardware processors; and one or more hardware storage devices having stored thereon computer-executable instructions that are executable by the one or more hardware processors and that configure the system to perform at least the following as part of a static analysis of intermediate language program code: identify a plurality of components in the intermediate language program code, each component comprising a different execution scope and including a corresponding contract, each contract conditioning further execution of the corresponding execution scope on whether a predicate of the contract is true when the contract is encountered at runtime of the corresponding execution scope; determine that a particular predicate of a particular contract corresponding to a particular component of the plurality of components may not always be true at runtime of the particular component; and generate executable code for the plurality of components into one or more executable binaries, including: when generating the executable code for the particular component, generate a portion of executable code having a first entry point that allows checking of the particular contract to be bypassed at runtime when the particular component is called by a first set of one or more other components of the plurality of components, and having a second entry point the causes the particular contract to be checked at runtime when the particular component is called by a second set of one or more other components of the plurality of components.

2. The system in accordance with claim 1, wherein the particular component instructs the system to perform a behavior, and wherein the particular contract is semantically structured in such a way that the checking of the particular contract may be removed without changing the behavior.

3. The system in accordance with claim 1, wherein each contract is semantically accessible to a caller of the corresponding component using an interface of the corresponding component.

4. The system in accordance with claim 1, wherein a contract is a pre-condition for a corresponding component.

5. The system in accordance with claim 1, wherein a contract is a post-condition for a corresponding component.

6. The system in accordance with claim 1, wherein if the particular predicate is not true when encountered at runtime, the system is configured to run external recovery code outside of the execution scope of the particular component.

7. The system in accordance with claim 1, wherein if the particular predicate is not true when encountered at runtime, the system is configured to conduct a fast fail for the particular component, such that no recovery code is run in response to the particular predicate not being true.

8. The system in accordance with claim 1, wherein the system is also configured to detect at least some conditions under which a predicate includes an externally visible side effect.

9. The system in accordance with claim 1, wherein the system is also configured to store the one or more executable binaries onto a storage device.

10. The system in accordance with claim 1, wherein the system is also configured to: determine that another predicate of another contract corresponding to another component of the plurality of components will always be true at runtime of the other component; and when generating the executable code for the plurality of components into one or more executable binaries, generating a third portion of executable code for the other component, the third portion of executable code that lacking any executable code corresponding to the other contract and the other predicate, based on having determined that the other predicate will always be true at runtime of the other component.

11. A method, implemented at a computer system that includes one or more hardware processors, for performing a static analysis of intermediate language program code, the method comprising: identifying, at the one or more hardware processors, a plurality of components in the intermediate language program code, each component comprising a different execution scope and including a corresponding contract, each contract conditioning further execution of the corresponding execution scope on whether a predicate of the contract is true when the contract is encountered at runtime of the corresponding execution scope; determining, at the one or more hardware processors, that a particular predicate of a particular contract corresponding to a particular component of the plurality of components may not always be true at runtime of the particular component; and generating, at the one or more hardware processors, executable code for the plurality of components into one or more executable binaries, including: when generating the executable code for the particular component, generating a portion of executable code having a first entry point that allows checking of the particular contract to be bypassed at runtime when the particular component is called by a first set of one or more other components of the plurality of components, and having a second entry point the causes the particular contract to be checked at runtime when the particular component is called by a second set of one or more other components of the plurality of components.

12. The method in accordance with claim 11, wherein the static analysis is performed by at least one of a refactoring tool, a verification tool, and an automated documentation generator.

13. The method in accordance with claim 11, wherein a contract is a pre-condition for a corresponding component.

14. The method in accordance with claim 11, wherein a contract is a post-condition for a corresponding component.

15. The method in accordance with claim 11, wherein if the particular predicate is not true when encountered at runtime, external recovery code is run outside of the execution scope of the particular component.

16. The method in accordance with claim 11, wherein if the particular predicate is not true when encountered at runtime, a fast fail is conducted for the particular component, such that no recovery code is run in response to the particular predicate not being true.

17. The method in accordance with claim 11, further comprising storing, by the one or more hardware processors, the one or more executable binaries onto one or more hardware storage devices.

18. The method in accordance with claim 11, further comprising: determining that another predicate of another contract corresponding to another component of the plurality of components will always be true at runtime of the other component; and when generating the executable code for the plurality of components into one or more executable binaries, generating a third portion of executable code for the other component, the third portion of executable code that lacking any executable code corresponding to the other contract and the other predicate, based on having determined that the other predicate will always be true at runtime of the other component.

19. A computer program product comprising one or more hardware storage memories having stored thereon computer-executable that are executable by one or more hardware processors of a computer system, and that configure the computer system to perform at least the following as part of a static analysis of intermediate language program code: identify a plurality of components in the intermediate language program code, each component comprising a different execution scope and including a corresponding contract, each contract conditioning further execution of the corresponding execution scope on whether a predicate of the contract is true when the contract is encountered at runtime of the corresponding execution scope; determine that a first predicate of a first contract corresponding to a first of the plurality of components will always be true at runtime of the first of the plurality of components; determine that a second predicate of a second contract corresponding to a second of the plurality of components may not always be true at runtime of the second of the plurality of components; and generate executable code for the plurality of components into one or more executable binaries, including: when generating the executable code for the first of the plurality of components, generating a first portion of executable code that lacks any executable code corresponding to the first contract and the first predicate, based on having determined that the first predicate will always be true at runtime of the first of the plurality of components; and when generating the executable code for the second of the plurality of components, generate a second portion of executable code having a first entry point that allows checking of the second contract to be bypassed at runtime when the second component is called by a first set of one or more other components of the plurality of components, and having a second entry point the causes the second contract to be checked at runtime when the second component is called by a second set of one or more other components of the plurality of components.

20. The computer program product in accordance with claim 19, wherein if the second predicate is not true when encountered at runtime, the computer system is configured to conduct a fast fail for the second of the plurality of components, such that no recovery code is run in response to the second predicate not being true.

* * * * *